United States Patent
Masumoto et al.

[11] Patent Number: 5,809,094
[45] Date of Patent: Sep. 15, 1998

[54] SYNCHRONIZATION REGENERATION CIRCUIT

[75] Inventors: Takahiko Masumoto, Ora-gun; Kazuhiro Kimura, Fukaya; Hiroshi Kaneko, Ora-gun, all of Japan

[73] Assignee: Sanyo Electric Co., Ltd., Osaka, Japan

[21] Appl. No.: 654,858

[22] Filed: May 29, 1996

[30] Foreign Application Priority Data

| May 31, 1995 | [JP] | Japan | 7-134511 |
| May 31, 1995 | [JP] | Japan | 7-134512 |
| May 31, 1995 | [JP] | Japan | 7-134513 |

[51] Int. Cl.$^6$ .................................................. H04L 7/00
[52] U.S. Cl. ........................ 375/365; 375/366; 370/510
[58] Field of Search ..................... 370/509, 510, 370/513, 514, 544; 375/365, 366, 368, 370, 377; 327/141

[56] References Cited

U.S. PATENT DOCUMENTS

| 4,748,623 | 5/1988 | Fujimoto | 370/100 |
| 5,014,272 | 5/1991 | Yoshida | 370/108 |
| 5,107,495 | 4/1992 | Kamoi et al. | 370/105.1 |
| 5,303,270 | 4/1994 | Fujii | 375/365 |

*Primary Examiner*—Stephen Chin
*Assistant Examiner*—Joseph Roundtree
*Attorney, Agent, or Firm*—Loeb & Loeb LLP

[57] ABSTRACT

An offset circuit (2) detects an offset word serving as a synchronization pattern. By being triggered by the detection, main and subordinate synchronization detection circuits (5 and 6) detect the periodicity of the offset word only during a predetermined backward guard period. Both synchronization detection circuits (5 and 6) detect offset words at different timings. Therefore, if one synchronization detection circuit (5 or 6) fails in detection of synchronization, it is possible to use a detection result of the other synchronization detection circuit (5 or 6). Moreover, received data during the backward guard period is stored in a data memory (11). Therefore, it is possible to use the stored data as received data after detection of synchronization. Even after establishment of synchronization, the synchronization detection circuit (5 or 6) continuously detects the periodicity of an offset word at a timing different from an established timing. Therefore, when established synchronization is incorrect, it can immediately be corrected.

19 Claims, 7 Drawing Sheets

SYNCHRONIZATION REGENERATION CIRCUIT

BACKGROUND OF THE INVENTION

1. Field of the Invention

The present invention relates to a synchronization regeneration circuit for receiving a signal to which a predetermined synchronizing signal is added, such as a signal output in RDS (Radio Data System) broadcast, and establishing the synchronization of a system.

2. Description of the Prior Art

To synchronize a transmission side with a reception side, a predetermined synchronizing signal has conventionally been added to a certain cycle of signal to be transmitted. Particularly in the case of a system for receiving a digital signal, it is necessary to accurately detect a synchronizing signal added at the time of transmission to establish the synchronization of the system and determine the periodicity of the synchronizing signal.

However, a false synchronization pattern accidentally generated in data may frequently and erroneously be detected instead of a true synchronization pattern of a synchronizing signal and thereby, a synchronous circuit may start a synchronization capturing operation at the timing of the false synchronization pattern.

Therefore, a synchronous circuit is constituted so as to wait for a plurality of synchronization patterns meeting a periodicity to be detected in accordance with the timing when detecting the first synchronization pattern by considering that erroneous data occurs in a transmission line and establishing the synchronization of a system when detecting a predetermined number of correct synchronization patterns. In the present application, the waiting period for a plurality of synchronization patterns meeting a periodicity is called as a backward guard period. The above structure is generally referred to as a protection circuit and the protection circuit is referred to as a backward guard circuit because the circuit performs protective operations in the backward guard period during an asynchronous period.

In the case of the RDS broadcast, for example, transmission data is formed every 26 bits for one block and a specific synchronization pattern is added to 10 parity bits included in the data. A reception side establishes synchronization by detecting the added synchronization pattern. The specific synchronization pattern incudes the types of A, B, C, C', D, and E, each of which is referred to as offset word A, offset word B, or the like. An offset word is detected by inputting each received 26-bit block signal to a syndrome register and using the fact that the syndrome has a specific value corresponding to each offset word. It is determined that offset words to be transmitted are added so as to circulate in a predetermined sequence of A->B->C(C')->D->A and the synchronization of a system is regenerated by detecting an offset word in the above sequence every 26 bits.

Conventionally, when a synchronous circuit erroneously starts a synchronization capturing operation due to a false synchronization pattern generated in data as described above, it detects a synchronization pattern at an incorrect timing according to the false synchronization pattern during a backward guard period determined by a system. However, it is rare for a synchronization pattern to be detected again next time at the incorrect timing and in many cases, the next synchronization pattern cannot be detected during the backward guard period. Therefore, because it is necessary to newly detect a synchronization pattern after the backward guard period and start the synchronization capturing operation again in accordance with the newly detected synchronization pattern, establishing synchronization is delayed.

Moreover, data processing at a rear stage, such as error correction, is conventionally started with a data block in which synchronization is established. This is because it is considered that accurate processing cannot be performed even if performing data processing by using data during a backward guard period because the data during the backward guard period of synchronization is not always correct in timing.

However, after a correct timing is detected, it must be possible to process the data in a data block during the backward guard period. Therefore, there is a problem that no effective data can be used during the backward guard period.

Moreover, a synchronization detection circuit is conventionally controlled so as to cancel synchronization when a synchronization pattern cannot consecutively be detected a plurality of times, by considering that the reason a synchronization pattern cannot be detected is because an error occurs in data on a transmission line. In the present application, the waiting period for determining whether a synchronization pattern cannot consecutively be detected is called a forward guard period. The above control is normally referred to as a forward guard operation because it is performed during a forward guard period under an asynchronous state.

A synchronization pattern is frequently detected at an incorrect timing due to interference by a false synchronization pattern accidentally generated in data, or fading generated on a transmission line, and a synchronization regeneration circuit of a receiver may establish the synchronization of a system in accordance with the incorrect timing.

Therefore, synchronization is initially established at an incorrect timing, the synchronization at the incorrect timing is maintained during the forward guard period predetermined in a receiving system, the synchronization of the receiving system is not canceled until a forward guard condition is satisfied, and a new synchronization pattern recapturing operation is started.

Therefore, a problem occurs that it takes a long time to detect a correct synchronization timing.

SUMMARY OF THE INVENTION

It is an object of the present invention to establish synchronization early by detecting a plurality of synchronizations.

It is another object of the present invention to effectively use correct data obtained before establishment of synchronization.

It is still another object of the present invention to complete synchronization in its early stages by reestablishing the synchronization when the synchronization is established at an incorrect timing. In the case of the present invention, a plurality of synchronization detection circuits are used and operated by synchronization pattern detection outputs at different timings. Therefore, even if one synchronous circuit detects a false synchronization pattern accidentally generated in data and starts a synchronization capturing operation, another synchronous circuit detects a true synchronization pattern and starts the operation during its backward guard period. Therefore, synchronization can be established in accordance with a correct synchronization pattern in a very short time compared to the case in which a backward guard period with a false synchronization pattern is completed, and thereafter a synchronization capturing operation is newly started, and as a result, the time until synchronization is established is not influenced by the false synchronization pattern.

Moreover, according to the present invention, a synchronization pattern is detected out of received data and the received data is sequentially stored in a data memory every data block from the point of time when a backward guard operation is started by a synchronization detection circuit. At this point in time, it is not known whether the backward guard data stored in the memory has a correct timing. However, because the stored backward guard period data is output from the memory when synchronization is established, it is possible to process the data in an effective data block.

Moreover, it is possible to accelerate data processing by storing the error corrected data during the backward guard operation as the data to be stored in the data memory.

Furthermore, in the case of the present invention, the synchronization of a receiving system is changed to a newly detected synchronization timing when a synchronization detecting operation is executed after establishment of synchronization and a synchronization pattern satisfying a certain condition is periodically detected at a timing other than the established present synchronization timing. Furthermore, because a synchronization detecting condition after establishment of synchronization is set more severely than a synchronization detecting condition before establishment of the synchronization, synchronization timings are changed only when more exact synchronization is established.

Therefore, when the present synchronization timing is erroneously established, it is not necessary to wait for the synchronization to be canceled during the forward guard period and it is possible to immediately change the synchronization timing of the receiving system to a correct synchronization timing.

DETAILED DESCRIPTION OF THE PREFERRED EMBODIMENTS

Figure 1:
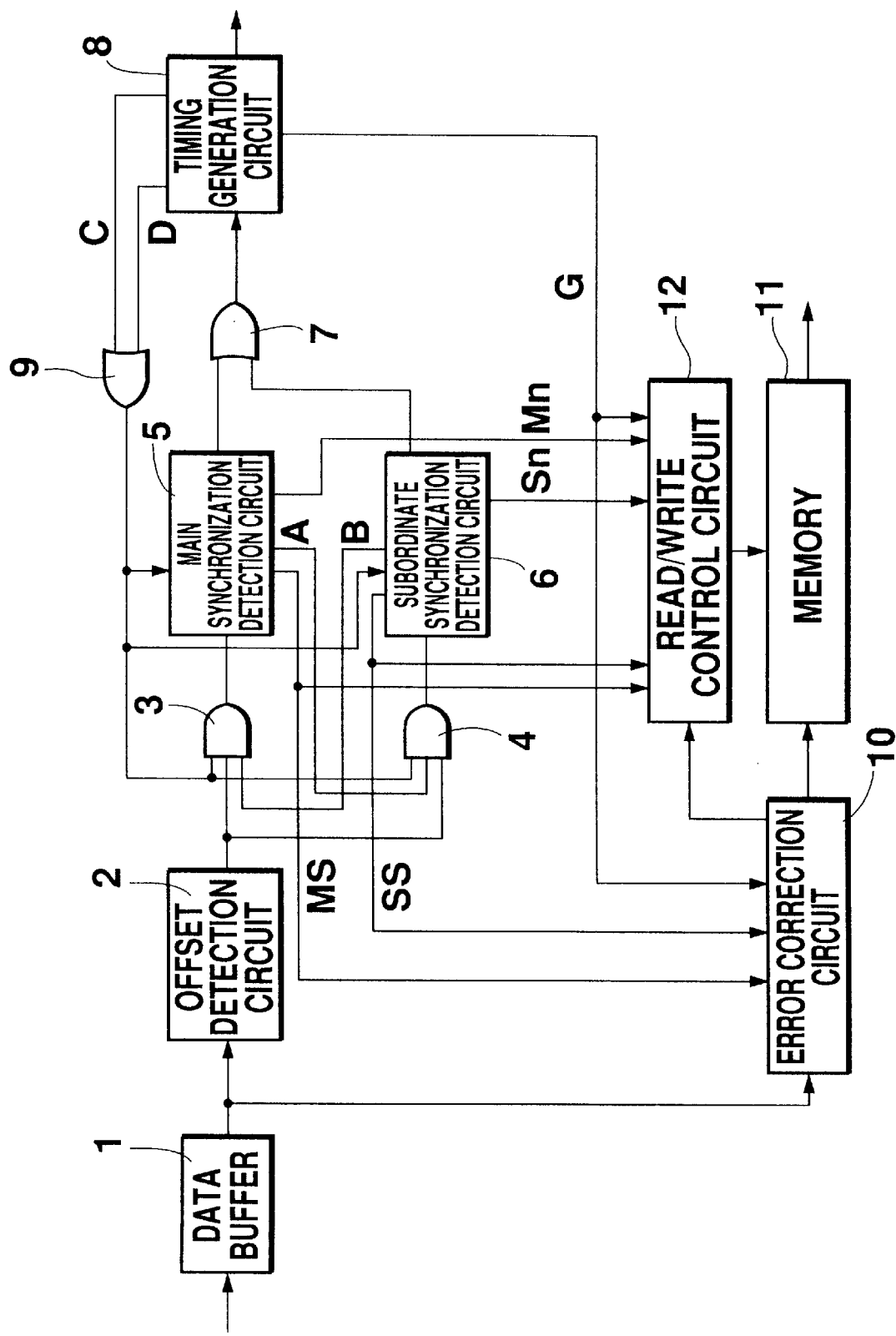
FIG. 1 is a block diagram showing the structure of an embodiment of the present invention.

FIG. 1 is a block diagram showing the structure of an embodiment of the present invention. In this case, a circuit for receiving an RDS signal is described below in which data of one block comprises 26 bits.

In FIG. 1, numeral 1 denotes a data buffer for sequentially capturing input data every bit and holding the latest 26-bits of captured data as one block, 2 denotes an offset detection circuit serving as a synchronization pattern detection circuit for detecting whether a predetermined offset word is present in captured one-block data whenever 1-bit data is input to the data buffer 1, 5 denotes a main synchronization detection circuit for inputting a detection result of the offset detection circuit 2 through an AND gate and determining whether a detected offset word meets a certain backward guard condition, 6 denotes a subordinate synchronization detection circuit for inputting a detection result of the offset detection circuit 2 through an AND gate 4 and determining whether a detected offset word meets a certain backward guard condition, and 8 denotes a timing generation circuit for establishing the synchronization between received data and a system to generate various synchronized timing signals when a synchronization detection signal output from the main synchronization detection circuit 5 or subordinate synchronization detection circuit 6 is applied to the circuit 8 through an OR gate 7 and the circuit 8 is reset by the synchronization detection signal.

The backward guard condition determined by the main synchronization detecting circuit 5 and the subordinate synchronization detecting circuit 6 is a condition indicating that an offset word is detected two times out of three blocks at a correct timing in a correct sequence. When the condition is effected, it is determined that synchronization is correctly performed and a synchronization detection signal is output. This determination is specified in a system as, for example, a period for determining three data blocks, and the period is referred to as a backward guard period.

The main synchronization detection circuit 5 constitutes a synchronization detection circuit with a high priority compared to the subordinate synchronization detection circuit 6 and control signals A and B are input to AND gates 3 and 4 so that these two synchronization detection circuits are not triggered by offset detection outputs at the same timing output from the offset detection circuit 2.

That is, the control signal A to be supplied to the AND gate 4 is a signal which is set to "1" at a timing other than the synchronization timing to be detected by the main synchronization detection circuit 5 while the circuit 5 operates. Therefore, the subordinate synchronization detection circuit 6 is controlled so that it does not operate until the offset detection circuit 2 detects an offset word at a timing different from the synchronization timing to be detected by the main synchronization detection circuit 5 while the circuit 5 operates.

The period in which the main synchronization detection circuit 5 and the subordinate synchronization detection circuit 6 operate is defined as a period in which the circuits 5 and 6 determine the above-described backward guard condition.

The control signal B to be supplied to the other AND gate 3 is a signal which is set to "1" while the circuit 6 does not operate and at a timing other than the synchronization timing to be detected by the subordinate synchronization detection circuit 6 when the detection circuit 6 operates. Therefore, the main synchronization detection circuit 5 is controlled so that it operates when the offset detection circuit 2 detects an offset word at a timing different from the synchronization timing to be detected by the subordinate synchronization detection circuit 6 while the circuit 6 is operating and at any time when the synchronization detection circuit 6 is not operating.

The period in which the main synchronization detection circuit 5 and the subordinate synchronization detection circuit 6 operate is defined as a period in which the circuits 5 and 6 determine the above-described backward guard condition.

Therefore, unless any synchronization detection circuit operates, the main synchronization detection circuit 5 starts to operate when an offset word is detected. The subordinate synchronization detection circuit 6 operates if an offset word is detected at a timing different from the synchronization timing to be detected by the main synchronization detection circuit 5 while the main synchronization detection circuit 5 operates.

Moreover, unless a condition is not satisfied during the backward guard period in the main synchronization detection circuit 5 while the main and subordinate synchronization detection circuits 5 and 6 operate, the main synchronization detection circuit 5 restarts a synchronization detecting operation when an offset word is detected at a timing other than the synchronization timing at which the subordinate synchronization detection circuit 6 operates.

Figure 2:
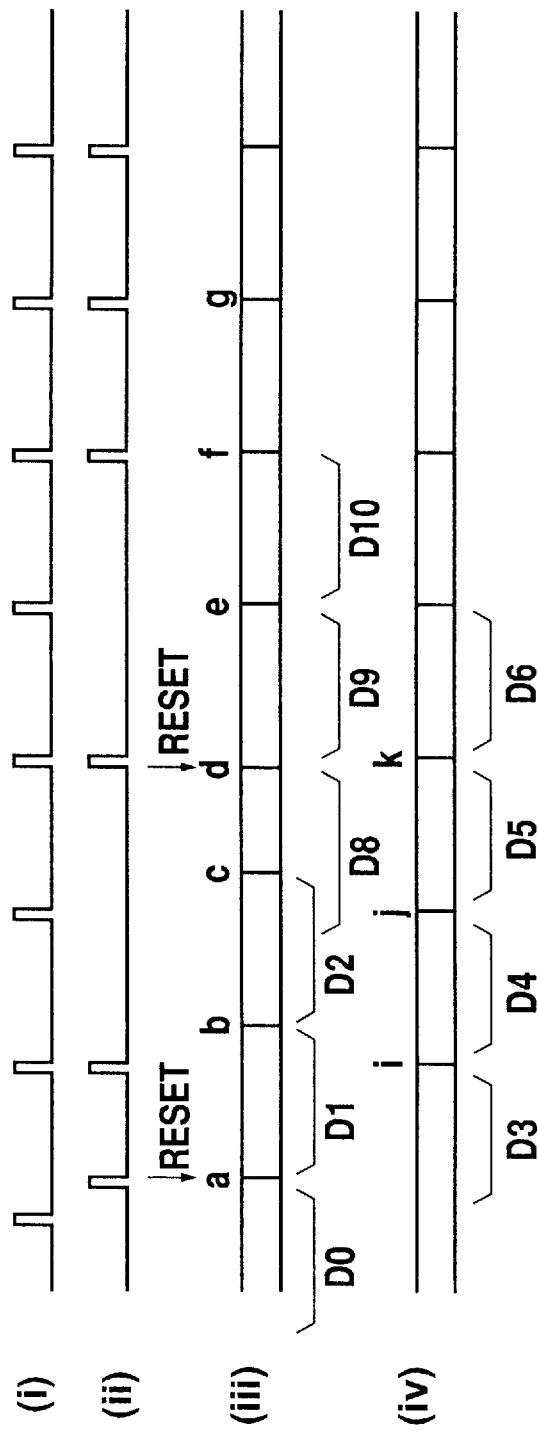
FIG. 2 is a timing chart for explaining a synchronization detecting operation of an embodiment before establishment of synchronization.

Therefore, two synchronization detection circuits are always controlled so that the two detection circuits do not detect an offset word at the same timing and operate so as to detect a true synchronization timing while compensating each other. Therefore, establishment of synchronization is not delayed due to an erroneously detected offset word. A specific example is described below by referring to FIG. 2. In FIG. 2, signal "i" denotes a true offset timing, signal "ii" denotes an offset timing detected by the offset detection circuit 2, signal "iii" denotes an operation timing of the main synchronization detection circuit 5, and signal "iv" denotes an operation timing of the subordinate synchronization detection circuit 6.

In the offset detection circuit 2, it is not always possible to actually detect an offset at every synchronization timing as shown by signal "ii" because of interference or noise generated on a transmission line even if a true offset word detection timing is set as shown by signal "i".

Therefore, when it is assumed that a pseudo offset word is generated in data at a timing "a" and the offset detection circuit 2 detects the pseudo offset word, the main synchronization detection circuit 5 starts operation to detect synchronization at the incorrect timing. That is, the circuit 5 determines whether an offset is detected at periodic timings "b" and "c" every 26 bits during the backward guard period (during determination three times) by using the timing "a" as a start point. If a backward guard condition is designated as two times out of three, as described above, a correct offset must be detected two times out of the timings "a", "b", and "c". In this case, however, because synchronization is performed at an incorrect timing, no offset is detected, the main synchronization circuit 5 is reset at a timing "d", and a synchronization capturing operation is restarted.

When the subordinate synchronization detection circuit 6 is absent, the main synchronization detection circuit 5 must detect a correct offset at least twice after starting a recapturing operation. Therefore, true synchronization is established at the timing "f" at the earliest and thus, establishment of the synchronization is extremely delayed due to erroneous synchronization detection. In the case of this embodiment, however, even if the main synchronization detection circuit 5 starts operation in accordance with an erroneously detected offset as shown by signal "iii", the subordinate synchronization detection circuit 6 starts operation at a different timing when an offset is detected at the timing. Therefore, when a true offset is detected by the offset detection circuit 2 at the timing "i", the subordinate synchronization detection circuit 6 starts operation at the timing "i" as shown by signal "iv". Therefore, true synchronization is established at a timing "k" for detecting the second offset. Moreover, when the synchronization is established, a synchronization detection signal is output from the subordinate synchronization detection circuit 6 to reset the timing generation circuit 8 through the OR gate 7 and thereby, a timing signal synchronizing with received data is generated. Because the synchronization detection circuits 5 and 6 are respectively provided with a flip flop as described later, an H-level synchronization detection signal is continuously output when synchronization is established and the output of the OR gate 7 becomes an H-level. Therefore, when synchronization is established by one synchronization detection circuit, the timing generation circuit 8 is not reset by the other synchronization detection output even if a backward guard condition is satisfied by the other synchronization detection circuit which started operation before the synchronization was established.

Though the above embodiment uses two synchronization detection circuits, it is possible to realize more stable synchronization detection by connecting three or more circuits.

The synchronization detecting operation after establishment of synchronization will be described below. This embodiment is constituted so that a synchronous circuit operates even after synchronization is established when an offset is detected at a timing different from the timing when the synchronization is established. That is, the timing generation circuit 8 outputs a control signal C which becomes an H-level at a timing other than the established synchronization timing under a synchronization established state and a control signal D which becomes an L-level under the synchronization established state and supplies the output of an OR gate 9 for receiving the control signals D and C to the AND gates 3 and 4.

Therefore, the synchronization detection circuits 5 or 6, as described above, operate in accordance with the offset detection signal at every timing when synchronization is not established and operate in accordance with an offset detection signal detected at a timing other than the established synchronization timing. Moreover, when the synchronization detection circuits 5 or 6 establish synchronization at a new timing in the above synchronization detecting operation after the synchronization is established, a synchronization detection signal at a newly detected timing is transmitted to the timing generation circuit 8 to reset the circuit 8 and synchronization is established at the new timing.

Therefore, the synchronization detecting operation is continued even after establishment of synchronization and, when a synchronization detection signal is output at a timing other than the present synchronization timing, the synchronization of a system is changed to the new synchronization timing. However, because a case is also considered in which the synchronization of the changed timing is based on erroneous detection, it is preferable to detect the changed synchronization more securely than the synchronization to be changed. Therefore, in this case, a backward guard condition after establishment of synchronization is set more severely than a backward guard condition before establishment of synchronization. That is, to establish synchronization through offset detection of two times out of five during an asynchronous period, the new synchronization is not established until an offset is detected two times or three times out of three after the synchronization is established.

Figure 3:
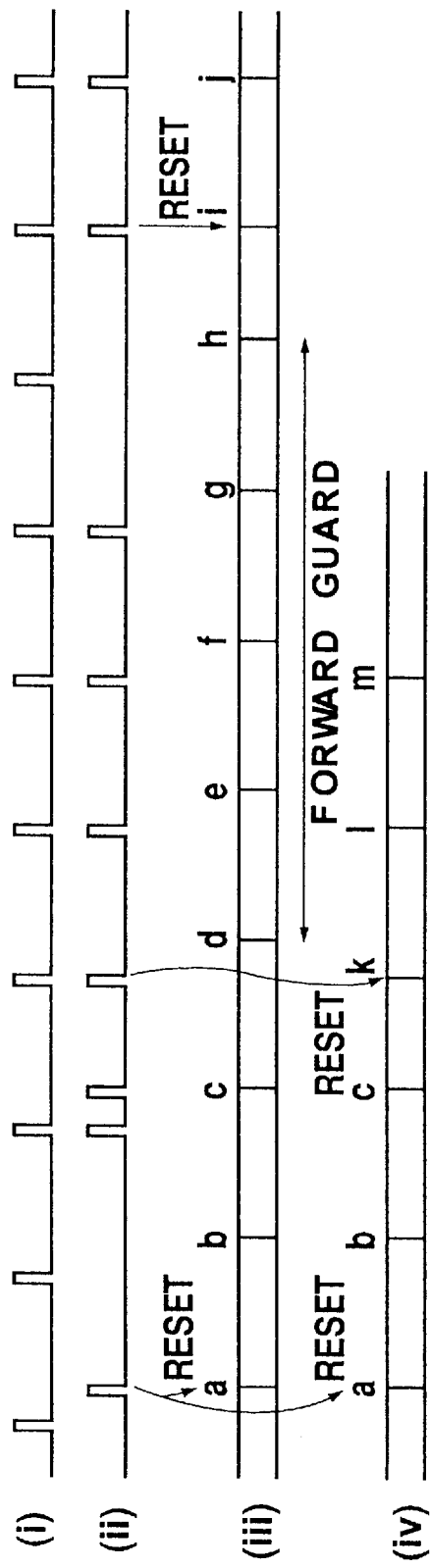
FIG. 3 is a timing chart for explaining a synchronization detecting operation of an embodiment after establishment of synchronization.

Moreover, it is possible to store the offset detection frequency when synchronization is first established and change the present synchronization timing to a new synchronization timing when offsets more than the frequency are detected after the synchronization is established. An example is described below by referring to FIG. 3. In FIG. 3, signal "i" denotes a true offset detection timing, signal "ii" denotes an offset detection timing detected by the offset detection circuit 2, signal "iii" denotes an operation timing detected by the synchronization detection circuit 5 or 6 under an asynchronous state, and signal "iv" denotes a synchronization detecting operation timing detected by the synchronization detection circuit 5 or 6 after establishment of synchronization.

When the offset detection circuit 2 detects a pseudo offset at a timing "a", the synchronization detection circuit 5 or 6 determines whether an offset is detected at 26-bit periodic timings "b" or "c" by using the timing "a" as a start point. When a backward condition is designated as two times out of three and an offset is accidentally detected at the timing "c", the synchronization detection circuit erroneously establishes the synchronization of a system at this timing. Conventionally, when synchronization is initially established as described above, a system starts a forward protecting operation by a not-illustrated forward guard circuit and monitors whether an offset is periodically detected at timings "d", "e", "f", "g", and "h". Moreover, because no offset is detected during the above period, the synchronous state is canceled at the timing "h".

Thereafter, when the synchronization detection circuit 5 or 6 detects a true offset at the timing "i" and a backward guard condition is satisfied at the timing "j", a correct synchronization timing is established. That is, if an incorrect synchronization timing is initially used, a lot of time is expended until a correct synchronization restarts.

In the case of this embodiment, however, the synchronization detection circuit 5 or 6 detects synchronization at a different timing even after the synchronization is established as described above. Therefore, even if an incorrect synchronization is established at the timing "c", the synchronization detection circuit 5 or 6 restarts a synchronization capturing operation by detecting a correct offset at the timing "k". When a period correct offset is detected at timings "l" or "m", the detection frequency comes to 3 times and the synchronization timing of a system is changed to a new synchronization timing by assuming that exact synchronization with an accuracy higher than that of the synchronization previously established at the timing "c" is established and resetting the timing generation circuit 8.

In the case of this example, the backward guard condition after establishment of synchronization is set to a case in which a correct offset is detected three times out of three, which is more severe than the condition of two times out of three before establishment of synchronization.

According to the above operation, it is possible to change a synchronization timing to a correct synchronization timing at the timing "m" which is faster than the conventional timing "j". A structure for storing obtained data in a memory is described below. This embodiment is provided with an error correction circuit 10 for capturing the data of 26 bits for one block held by the data buffer 1 in accordance with a control signal MS or SS output from the synchronization detection circuit 5 or 6 and a control signal G output from the timing generation circuit 8 and correcting errors of the data and a memory 11 for storing error corrected data, and a read/write control circuit 12 for controlling read/write of data from/in the memory 11. The memory 11, as shown in FIGS. 4A and 4B, has a first area MR1 for storing error corrected data after establishment of synchronization, a second area MR2 for storing error corrected data during the backward guard period in the main synchronization detection circuit 5 before establishment of synchronization, and a third area MR3 for storing error corrected data during the backward guard period in the subordinate synchronization detection circuit 5 before establishment of synchronization.

Operations of these circuits are described below by referring to FIG. 2 described above. First, the main synchronization detection circuit 5 or the subordinate synchronization detection circuit 6 transmits the main control signal MS and the subordinate control signal SS which are output whenever the synchronous circuit of its own receives an input offset detection signal and performs operations to the read/write control circuit 12, and moreover transmits counted values Mn and Sn which indicate nth-time offset detection in the backward guard period to the read/write control circuit 12 as addresses.

Therefore, as shown by signal "iii" in FIG. 2, the main synchronization detection circuit 5 starts operation at the timing "a" in accordance with erroneous detection of an offset word and then transmits the control signal MS to an error correction circuit 9. The error correction circuit captures data of 26 bits for one block from the data buffer 1 in accordance with the control signal MS to correct errors in the data and transmits error corrected data for each block to the memory 11. The read/write control circuit 12 selects the second area MR2 of the memory 11 to write error corrected data in an address Mn of the area MR2 when the main control signal MS is output. It is preferable to store not only error corrected data but also synchronization pattern recognition data, number of error correction bits, and synchronization information related to the block data. In the case of the example in FIG. 2, the first corrected data D0 is stored in an address "00" of the second area MR2 because the counted value Mn is reset to "00" at the timing "a". Thereafter, the main synchronization detection circuit 5 detects synchronization at periodic timings "b" and "c". Whenever synchronization is detected, the counted value Mn of the counter is increased.

Figure 4A:
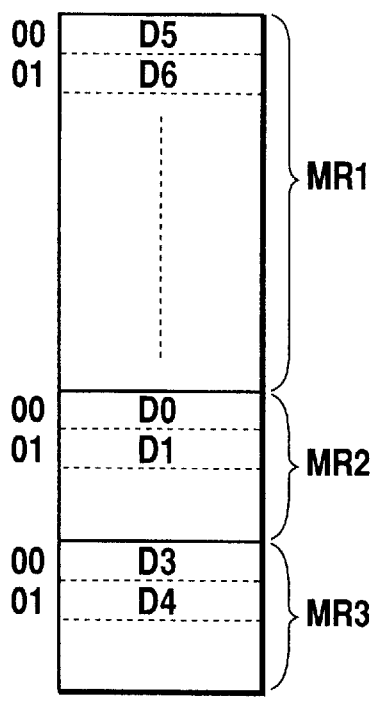
FIGS. 4A and 4B are block diagrams showing data memory structures of an embodiment.
Figure 4B:
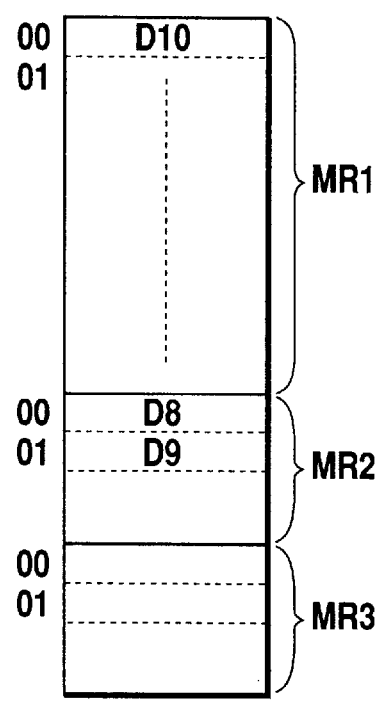

Therefore, as shown in FIG. 4A, error corrected data values D0 and D1 at the timings "a" and "b" are sequentially stored in addresses "00" and "01" of the second area MR2. In this case, however, because the second-time offset is not detected at the timings "b" and "c", it is determined that these timings are not correct and therefore, the data at the timing "c" is not stored in the memory 11. When the subordinate synchronization detection circuit 6 starts operation in accordance with detection of a correct offset at the timing "i", the control signal SS is output, synchronization is detected at the periodic timings "j" and "k", the counted value Sn is increased for each detection, and error corrected data values D3 and D4 at the timings "i" and "j" are sequentially stored in addresses "00" and "01" of the third area MR3. When detection is performed by the subordinate synchronization detection circuit 6 twice out of three times at the timings "i" and "k", synchronization is established because it is determined that a backward guard condition is satisfied. After the synchronization is established, the control signal D showing a synchronization established state output from the timing generation circuit 8 becomes an L-level. Therefore, error corrected data values D5, D6, . . . after establishment of the synchronization are sequentially stored in the first area MR1 of the memory 11. After establishment of the synchronization, an error correcting operation is performed in accordance with the control signal G output from the timing generation circuit 8. When a read request is input from an external unit after data write is thus completed, the read control circuit 12 reads valid data values D3 and D4 during the backward guard period from an area corresponding to a synchronization detection circuit with its synchronization established, that is, the third area MR3 in this case in order of address and then reads data values D5, D6, . . . after establishment of synchronization from the first area MR1 in order of address.

If both main and subordinate synchronization detection circuits start synchronization at an incorrect timing, the main synchronization detection circuit 5 is reset again at the timing "d" of the signal "iii" as shown in FIG. 2. Thereafter, the circuit 5 performs detection at the periodic timings "e", "f", and "g" and synchronization is thereby established at the timing "f". In this case, a counter in the main synchronization detection circuit 5 is reset at the timing "d" and the counted value Mn returns to "00". Therefore, error corrected data values D8 and D9 at the timings "d" and "e" during the backward guard period are overwritten in the addresses "00" and "01" of the second area MR2 in the memory 11 as shown in FIG. 4B. Moreover, the same overwriting is performed in the subordinate synchronization detection circuit 6. Therefore, in this case, data values D8 and D9 are read from the second area MR2 of the memory 11 as valid data. Specific circuits of this embodiment are described below in detail by stressing the main and subordinate synchronization detection circuits 5 and 6 and referring to FIGS. 5, 6, and 7.

Figure 7:
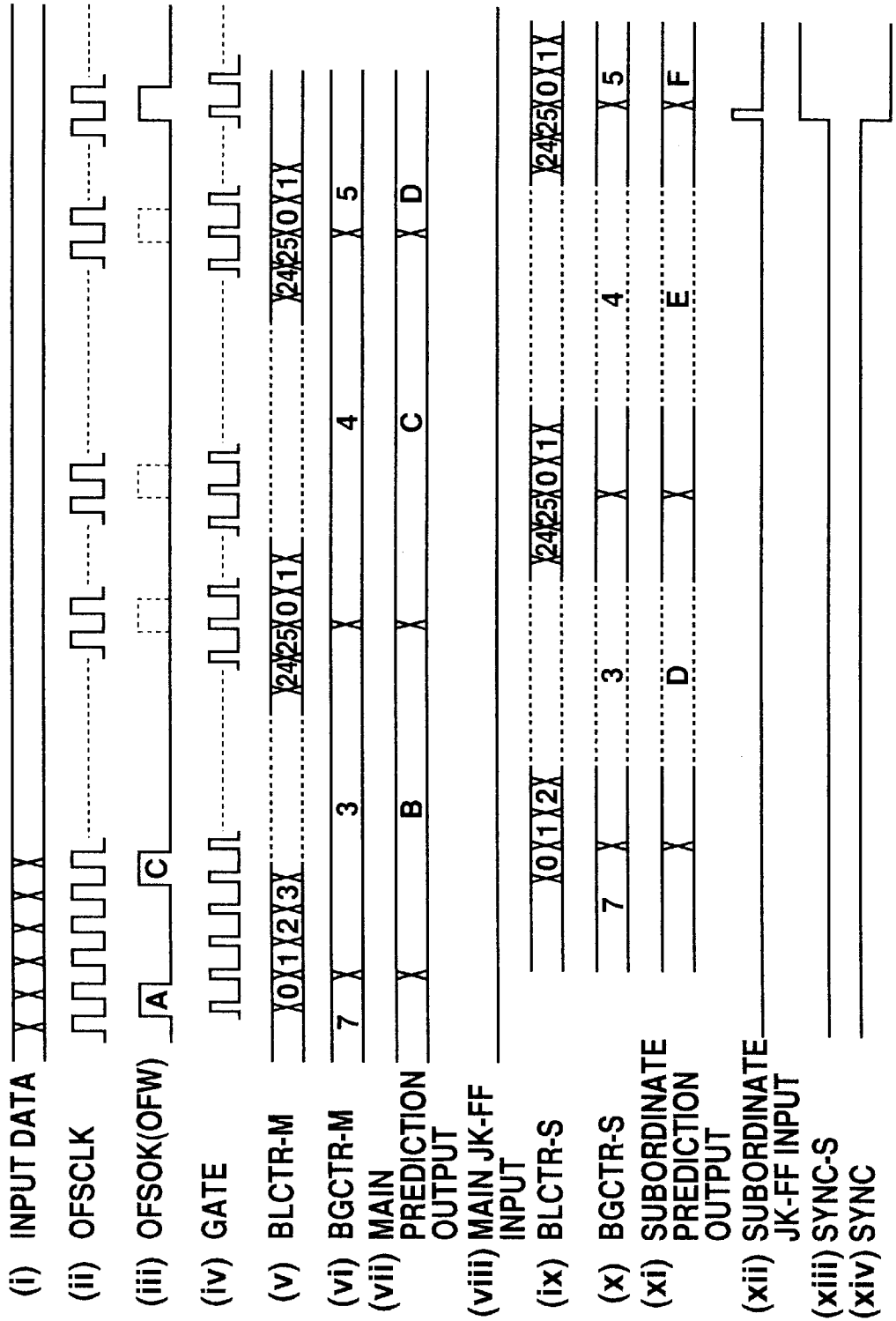
FIG. 7 is a timing chart for explaining operations of a specific circuit.

First, the offset detection circuit 2 performs offset detection synchronously with an offset clock signal OFS CLK shown by signal "ii" in FIG. 7. When the circuit 2 detects an offset, it outputs an offset detection signal OFSOK shown by signal "iii" and type-of-offset data OFW showing the type of detected offset. Then, the detection signal OFSOK is input to the main synchronization detection circuit 5 and the subordinate synchronization detection circuit 6 through the NAND gates 3 and 4 also shown in FIG. 1. Because the main and subordinate synchronization detection circuits 5 and 6 have the same structure, the illustration and description of the subordinate synchronization detection circuit 6 are omitted and internal circuits of only the main synchronization detection circuit 5 are described below.

Figure 5:
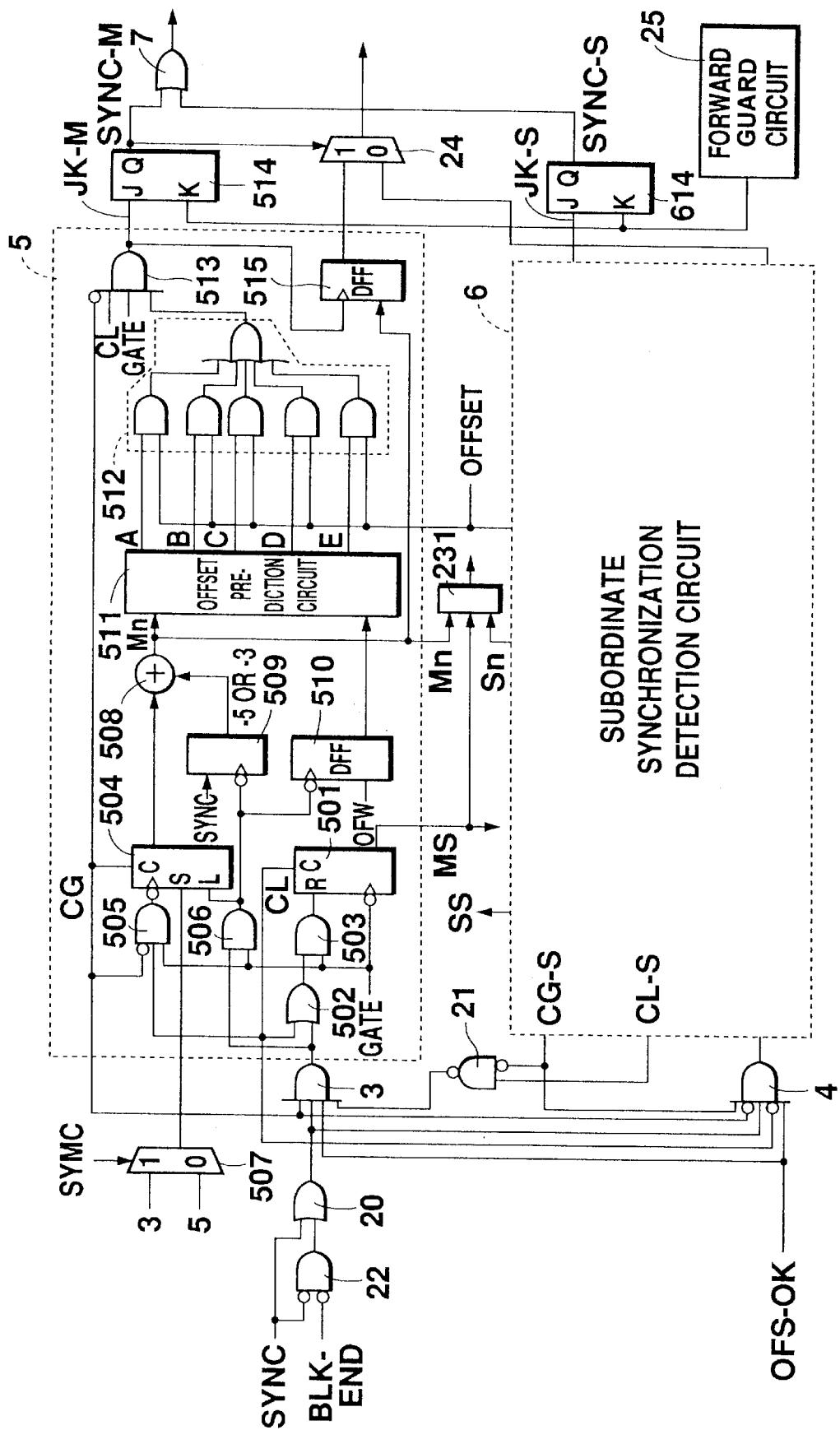
FIG. 5 is a specific circuit diagram of a synchronization detection circuit of an embodiment.
Figure 6:
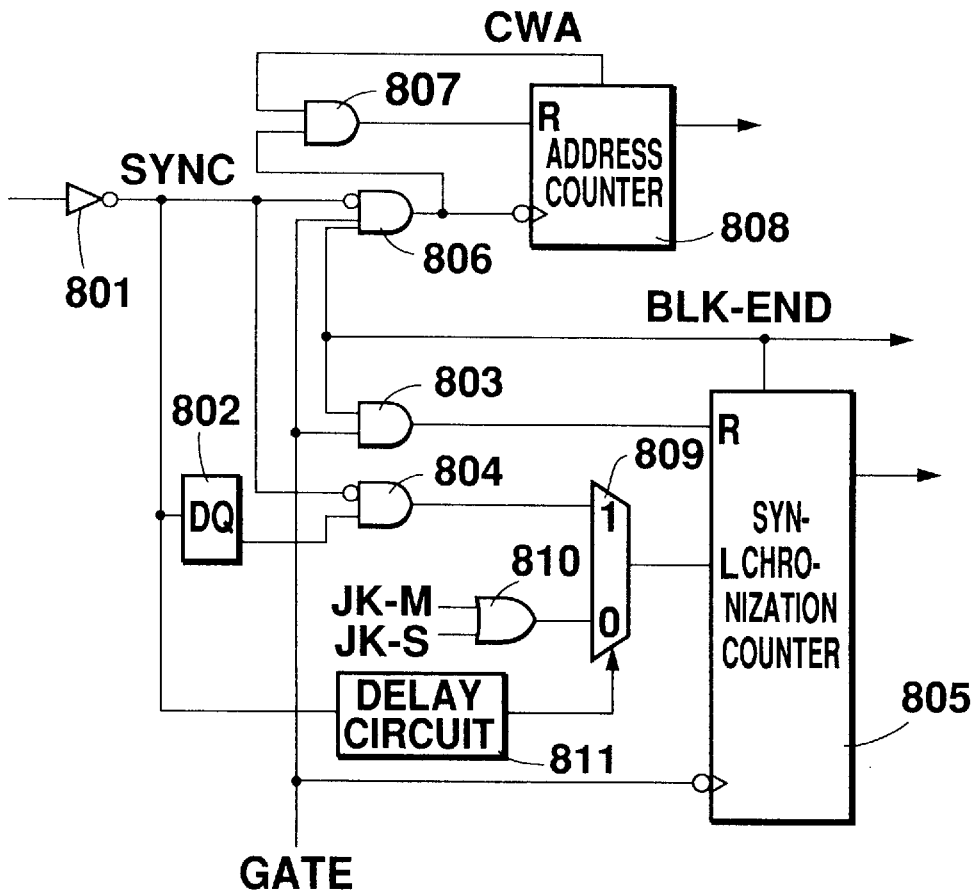
FIG. 6 is a specific circuit diagram of a timing generation circuit of an embodiment.

In FIG. 5, numeral 501 denotes a block counter which counts whenever one bit of data is input in FIG. 7 using a gate signal GATE as a clock, as shown by signal "iv", and generates an output signal MS whenever 26 bits are counted. The counter 501 is reset by the offset detection signal OFSOK, input through an OR gate 502 and an AND gate 503, and its own carry signal CL. Numeral 504 denotes a backward guard counter which counts the carry signal CL of the block counter 501 through an AND gate 505, which also receives the Inverted signal of a carry signal CG of its own and the gate signal GATE as inputs, and receives a predetermined value selected by a multiplexer 507 at a set terminal S. The predetermined value input to the set terminal S is loaded in accordance with the output of an AND gate input with the offset detection signal OFSOK and a gate signal. Numeral 508 denotes an adder for adding a predetermined value output from a decoder 509 to the contents of the backward guard counter 504 and outputting the offset-word detection frequency Mn during the backward guard period. Numeral 510 denotes a D flip flop for capturing the type-of-offset data OFW output from the offset detection circuit 2 in accordance with the output of the AND gate 506. Numeral 511 denotes an offset prediction circuit for an offset to be next input in accordance with the captured type-of-offset data OFW and the offset detection frequency Mn output from the adder 508. Numeral 512 denotes an offset coincidence circuit for detecting whether the predicted offset coincides with an offset OFFSET actually detected at the next timing. Numeral 514 denotes a JK flip flop for holding a coincidence signal JK-M output through an AND gate 513 and generating a synchronization detection signal SYC-M as an output. Numeral 515 denotes a D-type flip flop for capturing the frequency Mn output from the adder 508 by using the coincidence signal JK-M as a clock signal. The backward guard counter 504 comprises a 3-bit counter. The synchronization detection signal SYNC-M output from the main synchronization detection circuit 5 and a synchronization detection signal SYNC-S output from the subordinate synchronization detection circuit 6 are input to the timing generation circuit 8 through the OR gate 7 also shown in FIG. 1. The timing generation circuit 8, as shown in FIG. 6, is provided with an inverter 801 for inverting the output of the OR gate 7 and outputting a synchronization detection signal SYNC, a D-type flip flop 802 for capturing the signal SYNC, a synchronization counter 805 for counting using the gate signal GATE as a clock signal and generating a timing signal for synchronizing a system whenever 26 bits are counted, the counter 805 being reset by the output of the AND gate 803, receiving as inputs the signal GATE and the carry signal BLK-END of the counter itself, and loaded with a predetermined value in accordance with the output of an AND gate 804 receiving as inputs the inverted signal of the signal SYNC and the output of the D-type flop 802, and an address counter 808 which receives the output of an AND gate 806 as a clock signal, the ANP gate 806 having the carry signal BLK-END of the synchronization counter 805, the gate signal GATE, and the inverted signal of the signal SYNC as inputs. The counter 808 is reset in accordance with the output of an AND gate 807 which has a carry signal CWA from the counter 808 itself and the output from the AND gate 806 as inputs. In this case, the output of the AND gate 804 is not connected to a load terminal L of the synchronization counter 805 but it is input to one terminal of a multiplexer 809 selected by a delayed SYNC signal obtained by delaying the signal SYNC up to a predetermined period by a delay circuit 811. Moreover, an input signal to the JK flip flop 514 and a JK flip flop 614 in the synchronization detection circuits 5 and 6 is input to the other terminal of the multiplexer 809 through an OR gate 810 and the output of the multiplexer 809 is input to the load terminal L. The AND gate 3 receives not only the offset detection signal OFSOK but also the carry signal CG of the backward guard counter 504 and the output of an OR gate 20 for inputting the signal SYNC and moreover, the output of a NAND gate 21 for inputting the inverted signal of a carry signal CG-S of a backward guard counter 604 in the subordinate synchronization detection circuit 6 and a carry signal CL-S of a block counter 601. The OR gate 20 receives the output of an AND gate 22 for inputting the inverted signal of the signal SYNC and that of the carry signal BLK-END of the synchronization counter 805. Moreover, the AND gate 4 receives not only the offset detection signal OFSOK but also the inverted signal of the carry signal CG of the backward guard counter 504, the output of the OR gate 20, the inverted signal of the carry signal CL of the block counter 501, and the carry signal CG-S of the backward guard counter 604 in the subordinate synchronization detection circuit 6. Furthermore, the following are used: a multiplexer 23 for selecting the detection frequency Mn output from the main synchronization detection circuit 5 and the detection frequency Sn output from the subordinate synchronization detection circuit 6 in accordance with the output MS of the block counter 501 and a multiplexer 24 for selecting the coincidence signal JK-M output from the D flip flop 515 of the main synchronization detection circuit 5 and the coincidence signal JK-S output from the D flip flop 615 of the subordinate synchronization detection circuit 6 in accordance with the output SYNC-M of the JK flip flop 514. Operations of the specific circuit are described below by referring to FIG. 7. First, because the signal SYNC is at a 1 level when synchronization is not established, the output of the OR gate 20 is set to a 1 level. When no synchronization detection circuit operates, the AND gate 4 closes and application of an input signal is inhibited because the carry signal CG of the backward guard counter 504 is set to level 1. Moreover, under the above conditions, the AND gate 3 opens because the output of the NAND gate 21 is also set to level 1.

In this case, when an offset A is detected by the offset detection circuit 2 and the offset detection signal OFSOK is output as shown by signal "iii" in FIG. 7, the signal is input to the main synchronization detection circuit 5 and the internal block counter 501 is reset synchronously with the gate signal GATE as shown by signal "iv" in FIG. 7 and its contents are set to "0". Moreover, the multiplexer 507 selects "3" when synchronization is not established and "5" when synchronization is established in accordance with the signal SYNC. Therefore, when the offset detection signal OFSOK is input to the backward guard counter 504, "3" is loaded, as shown by signal (iv) in FIG. 7. The decoder 509 outputs "−3" when synchronization is not established and "−5" when synchronization is established in accordance with the signal SYNC. Therefore, in this case, the value "0" is output from the adder 508 as the offset detection frequency Mn during the backward guard period through the operation "3—3" and input to the offset prediction circuit 511. The type of detected offset is input to the offset prediction circuit 511 through the D-type flip flop 510 and an offset to be detected next is predicted in accordance with the type and the frequency Mn. In this case, because the offset A is first detected, an offset B is output from the offset prediction circuit 511.

The block counter 501 counts the gate signal GATE synchronizing with data input and its content BLCTR-M is sequentially incremented as shown by signal "v" in FIG. 7. When the content reaches 25, the counter 501 sets the carry signal CL to level 1. In this case, when the offset OFFSET detected by the offset detection circuit 2 is B, a level-1 coincidence signal is output from the coincidence circuit 512. Then, when the gate signal is set to level 1, the coincidence signal is input to the JK flip flop 514 through the AND gate 513 and its output SYNC-M is set to level 1. In the case of FIG. 7, however, because no offset is detected when the block counter 501 indicates 25, the block counter 501 is reset in accordance with the carry signal CL at the trailing edge of the next gate signal, the backward guard counter 504 is incremented as shown by signal (vi) in FIG. 7, and its content BGCTR-M comes 4. Therefore, the output of the offset prediction circuit 511 is also changed to C as shown by signal "vii" in FIG. 7. Because the backward guard condition in this example is designated as two times out of five, synchronization is established if a correct offset is detected even only once before the backward guard counter 504 indicates 7. In the case of signal "iv" in FIG. 7, however, counting is further continued as shown by signal "viii" in FIG. 7 and therefore, no offset is detected even when the block counter 501 becomes 25 again. However, when the main synchronization detection circuit 5 operates, the carry signal CG of the backward guard counter 504 is set to level 0. Moreover, when the content of the block counter 501 is not 25, the carry signal CL of the counter 504 is also set to level 0. Furthermore, when the subordinate synchronization detection circuit 6 does not operate, the carry signal CG-S of the subordinate backward guard counter 604 is set to level 1. Therefore, under the above conditions, the AND gate 4 outputs a level 1. When an offset C is detected at a different timing after the offset A is detected as shown by signal "iv" in FIG. 7, the detection signal OFSOK is input to the subordinate synchronization detection circuit 6 and the circuit 6 also starts operation.

In the subordinate synchronization detection circuit 6, the block counter 601, backward guard counter 604, and offset prediction circuit 611 operate in completely the same way as the main synchronization detection circuit 5 does, as shown by signals "ix", "x", and "xi" in FIG. 7. When the content BLCTR-S of the block counter 601 first reaches 25, no offset is detected. However, when the backward guard counter 604 indicates 4 and thereafter the block counter 601 indicates 25 again, an offset E is detected and coincides with a prediction result. Therefore, a level-1 coincidence signal is output from the coincidence circuit 612 to the JK flip flop 614 through the AND gate 613, as shown by signal "xii" in FIG. 7. Therefore, as shown by signal "xiii" in FIG. 7, the output signal SYNC-S of the flip flop 614 is set to level 1 and input to the timing generation circuit 8 through the OR gate 7.

In the timing generation circuit, a level-1 signal is inverted by the inverter 801 and the level-0 signal SYNC is generated, as shown by signal "xiv" in FIG. 7, and the signal SYNC is delayed by the D flip flop 802 and its inverted signal is input to AND gates 804 and 806. Because a delayed signal of the D flip flop 802 is input to the other terminal of the AND gate 804, a pulse is output from the gate synchronously with the trailing edge of level 0 of the signal SYNC and the synchronization counter 805 is reset by the pulse. Hereafter, whenever 26 gate signals are counted, the carry signal BLK-END is generated and the counter is reset by the signal. Moreover, the address counter 808 increments its counted value whenever inputting the carry signal BLK-END.

Thus, it is possible to generate a timing synchronizing with input data. The control signals MS and SS for the error correction circuit 10 and the read/write control circuit 12 use the outputs of the block counters 501 and 601 respectively and the control signal GS uses the carry signal BLK-END. Moreover, the addresses for the memory 11 use Mn and Sn which are the outputs of the multiplexer 23 during the backward guard period and use the outputs of the address counter 808 after establishment of synchronization. Furthermore, it is necessary to know how many data values are stored in the memory 11 during the backward guard period when reading data from the memory. Because the number of data values stored in the memory is equal to the offset detection frequency Mn of Sn, the frequency is selected by the multiplexer 24 and output to the read/write control circuit 12.

Then, operations after establishment of synchronization are described below. When synchronization is established, the inverted signal of the signal SYNC is set to level 1 and the carry signal BLK-END is set to level 1 at a timing other than the synchronization timing. Therefore, under the above conditions, the AND gate 22 outputs level 1 and the output of the OR gate 20 is also set to level 1. Therefore, when an offset is detected at a timing different from the established synchronization timing, the offset detection signal OFSOK is input to the synchronization detection circuit 5 or 6 through the AND gate 3 or 4 and the synchronization detection circuit starts the operation similarly to the case described above. However, because the signal SYNC is set to level 0, a predetermined value 5 is selected by the multiplexer 507 and the value is loaded in the backward guard counters 504 and 604. That is, the backward guard detection frequency reaches three times and synchronization is established only when a correct offset is detected two times out of three. Therefore, a backward guard condition is more severe than the condition when no synchronization is established. Thereby, synchronization timings are changed only for more exact synchronization. In this case, the synchronization timings are changed so that −5 is output from the decoder 509 in accordance with the fact that the initial value reaches 5. Moreover, in the timing generation circuit 8, the delayed SYNC signal for controlling change of the multiplexer 809 maintains an H level even after the signal SYNC whose synchronization is established becomes an L-level. Therefore, the output of the AND gate 804 is selected, a predetermined value is loaded into a synchronization counter in accordance with the delayed SYNC signal, and thereafter the synchronization counter 805 outputs a timing signal synchronizing with the timing. The delay time of the delay circuit 811 is set to a value almost equal to the backward guard period of a synchronization detection circuit. Therefore, even if a backward guard condition is satisfied by the other synchronization detection circuit starting operation before establishment of synchronization, no predetermined value is loaded in accordance with the synchronization detection output of the synchronization detection circuit. However, after the delay time passes, the output of the OR gate 810 of the multiplexer 809 is selected. Therefore, when the above severe backward guard condition is satisfied after establishment of synchronization, the then outputted signal JK-M or JK-S is input to the synchronization counter 805 through the multiplexer 809 and the predetermined value is loaded in accordance with the signal. That is, synchronization timings are changed. Unless any synchronization detection circuit is operated after establishment of synchronization, it is necessary to directly input the output of the AND gate 804 to the load terminal of the synchronization counter 805. A forward guard circuit 25 is a circuit for determining whether there is a period in which a predetermined number of offsets are not consecutively detected under a synchronization established state. When this state occurs, JK flip flops 514 and 614 are reset in order to cancel synchronization.

What is claimed is:

1. A synchronization regeneration circuit for establishing the synchronization of a receiving system by detecting the periodicity of a predetermined synchronization pattern from received data with the synchronization pattern added, comprising a synchronization pattern detection circuit for detecting said synchronization pattern and a plurality of synchronization detection circuits each for detecting the periodicity of said synchronization pattern based on a timing at which said synchronization pattern is detected by being triggered by the detection output of said synchronization pattern detection circuit; wherein each of said synchronization detection circuits detects said synchronization pattern periodicity in accordance with said synchronization pattern detection output at a different timing.

2. The synchronization regeneration circuit according to claim 1, wherein each of said synchronization detection circuits outputs a control signal showing a synchronization timing to be detected by its own circuit and includes a gate circuit for inhibiting said synchronization pattern detection output from being input by said control signal output from other synchronization detection circuits.

3. The synchronization regeneration circuit according to claim 1, wherein a priority is assigned to each of the synchronization detection circuits and the circuits receive said synchronization pattern detection output starting with a circuit having the highest priority.

4. The synchronization regeneration circuit according to claim 1, wherein each of said synchronization detection circuits detects periodicity in accordance with a change of said synchronization pattern and includes a counter for counting synchronization pattern detection frequency, a synchronization pattern prediction circuit for predicting a synchronization pattern to be next detected in accordance with the type of a synchronization pattern detected by each of said synchronization pattern detections circuit and said synchronization pattern detection frequency, and a coincidence circuit for determining the coincidence between a predicted synchronization pattern and a synchronization pattern next detected by each of said synchronization pattern detection circuits.

5. The synchronization regeneration circuit according to claim 4, wherein each of said synchronization detection circuits has holding means for holding the output of said coincidence circuit and said synchronization regeneration circuit is provided with a gate circuit whose output is determined by a signal held by any one of said holding means.

6. The synchronization regeneration circuit according to claim 1, wherein a data memory for sequentially storing received data during the backward guard period serving as a period for detecting the periodicity of a synchronization pattern in said synchronization detection circuit for each block is further included and the data during said backward guard period is read from said data memory after the periodicity of the synchronization pattern is detected by said synchronization detection circuit and it is detected that synchronization is established.

7. The synchronization regeneration circuit according to claim 6, wherein the data stored in said data memory is overwritten by received data during the next backward guard period of said synchronization detection circuit when synchronization is not established during said former backward guard period.

8. The synchronization regeneration circuit according to claim 6, wherein said synchronization detection circuit stores received data during the backward guard period of it in a separate memory area of said data memory for each block.

9. The synchronization regeneration circuit according to claim 8, wherein said synchronization regeneration circuit selects one of said memory areas corresponding to a synchronization detection circuit detecting establishment of synchronization among said synchronization detection circuits and reads data from the memory area.

10. The synchronization regeneration circuit according to claim 6, wherein said synchronization regeneration circuit is further provided with an error correction circuit for correcting errors in received data and said data memory stores error corrected data in said data memory.

11. The synchronization regeneration circuit according to claim 6, wherein said synchronization detection circuit has a counter for counting the synchronization pattern detection frequency during the backward guard period in accordance with said synchronization pattern detection output and writes data in said data memory by using said synchronization pattern detection frequency as an address.

12. The synchronization regeneration circuit according to claim 1, wherein said synchronization detection circuit operates even after detecting establishment of synchronization through detection of the periodicity of said synchronization pattern and, after establishment of synchronization, operates in accordance with said synchronization pattern detection output detected at a timing other than an established synchronization timing.

13. The synchronization regeneration circuit according to claim 12, wherein it is possible to set different conditions before and after establishment of synchronization as conditions for detecting establishment of synchronization in said synchronization detection circuit.

14. The synchronization regeneration circuit according to claim 13, wherein a condition for detecting establishment of synchronization after establishment of synchronization is made more severe than a condition for detecting establishment of synchronization before establishment of synchronization.

15. The synchronization regeneration circuit according to claim 13, wherein the synchronization pattern detection frequency at the time of establishment of synchronization in said synchronization detection circuit is stored and a detection frequency more than said stored detection frequency is set as a condition for detecting establishment of synchronization after establishment of synchronization.

16. The synchronization regeneration circuit according to claim 13, wherein said synchronization detection circuit detects periodicity in accordance with a change of said synchronization pattern and includes a counter in which a predetermined value is loaded in accordance with said synchronization pattern detection output and which counts the synchronization pattern detection frequency during the backward guard period and stops counting when a counted value reaches a specified value, a synchronization pattern prediction circuit for predicting a synchronization pattern to be next detected in accordance with the type of a synchronization pattern detected by said synchronization pattern detection circuit and said synchronization pattern detection frequency, and a coincidence circuit for determining the coincidence between a predicted synchronization pattern and a synchronization pattern next detected by said synchronization pattern detection circuit; and predetermined values different before and after establishment of synchronization are loaded in said counter.

17. The synchronization regeneration circuit according to claim 12, wherein said synchronization regeneration circuit is reset by the detection output of said synchronization detection circuit and further provided with a timing generation circuit for generating a control signal at an established synchronization timing, and said synchronization detection circuit has a gate circuit for inhibiting said synchronization pattern detection output from being input by said control signal.

18. A synchronization regeneration circuit for establishing the synchronization of a receiving system by detecting the periodicity of a predetermined synchronization pattern from received data with the synchronization pattern added, comprising a synchronization pattern detection circuit for detecting said synchronization pattern, a synchronization detection circuit for detecting the periodicity of said synchronization pattern based on a timing at which said synchronization pattern is detected by being triggered by the detection output of said synchronization pattern detection circuit, and a data memory for sequentially storing received data for each block; wherein data is read from said data memory after the periodicity of the synchronization pattern is detected and it is detected that synchronization is established.

19. A synchronization regeneration circuit for receiving a signal with a predetermined synchronization pattern added and establishing the synchronization of a receiving system by detecting the periodicity of said synchronization pattern, comprising a synchronization pattern detection circuit for detecting said synchronization pattern and a synchronization detection circuit for detecting the periodicity of said synchronization pattern based on a timing at which said synchronization pattern is detected by being triggered by the detection output of said synchronization pattern detection circuit; wherein said synchronization detection circuit operates even after detecting establishment of synchronization through detection of the periodicity of said synchronization pattern and, after establishment of synchronization, operates in accordance with said synchronization pattern detection output detected at a timing other than an established synchronization timing.

* * * * *